United States Patent [19]

Hopper

[11] 4,407,269
[45] Oct. 4, 1983

[54] SOLAR ENERGY COLLECTOR SYSTEM HAVING BALANCED HEAT-EXCHANGE FLUID FLOW

[75] Inventor: Thomas P. Hopper, Durham, Conn.

[73] Assignee: Sunsearch, Inc., Guilford, Conn.

[21] Appl. No.: 227,195

[22] Filed: Jan. 22, 1981

Related U.S. Application Data

[63] Continuation of Ser. No. 922,751, Jul. 7, 1978, abandoned.

[51] Int. Cl.$^3$ .......................... F24J 3/02; F16L 27/04; D03D 39/00; F28F 9/02
[52] U.S. Cl. .................................. 126/442; 126/450; 126/432; 285/371; 138/37; 165/174
[58] Field of Search ................. 138/44, 37, 177, 178; 126/442, 423, 448, 432; 137/571, 572, 575, 599; 165/174; 285/298, 397, 371, 370

[56] References Cited

U.S. PATENT DOCUMENTS

| | | | |
|---|---|---|---|
| 139,932 | 6/1873 | Sweetland | 285/371 |
| 439,888 | 11/1890 | McElroy | 126/129 |
| 1,814,897 | 7/1931 | Cox | 126/450 |
| 4,046,136 | 9/1977 | Izumi | 126/448 |
| 4,216,764 | 8/1980 | Clark | 126/448 |

Primary Examiner—Samuel Scott
Assistant Examiner—G. Anderson
Attorney, Agent, or Firm—Costas, Montgomery & Dorman

[57] ABSTRACT

A coupling used between headers of adjacent collectors in an array of solar collectors of the liquid heat-exchange type to balance the flow of heat exchange fluid through the absorber of each collector. The coupling is formed with an internal baffle in which an orifice of predetermined area is defined dependent on its position in the array.

The coupling may also be used to vent entrapped air from the headers and to drain liquid from them.

10 Claims, 11 Drawing Figures

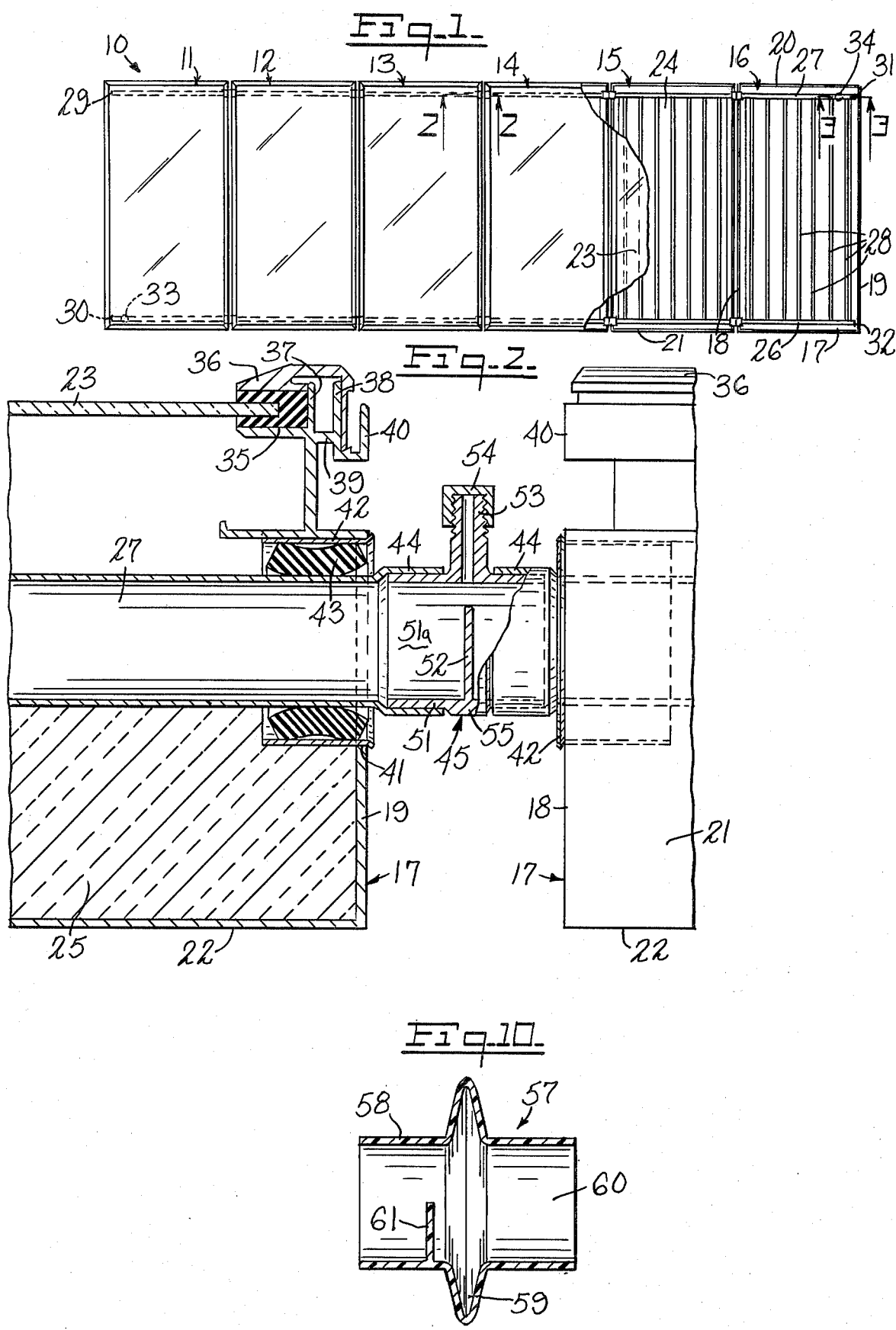

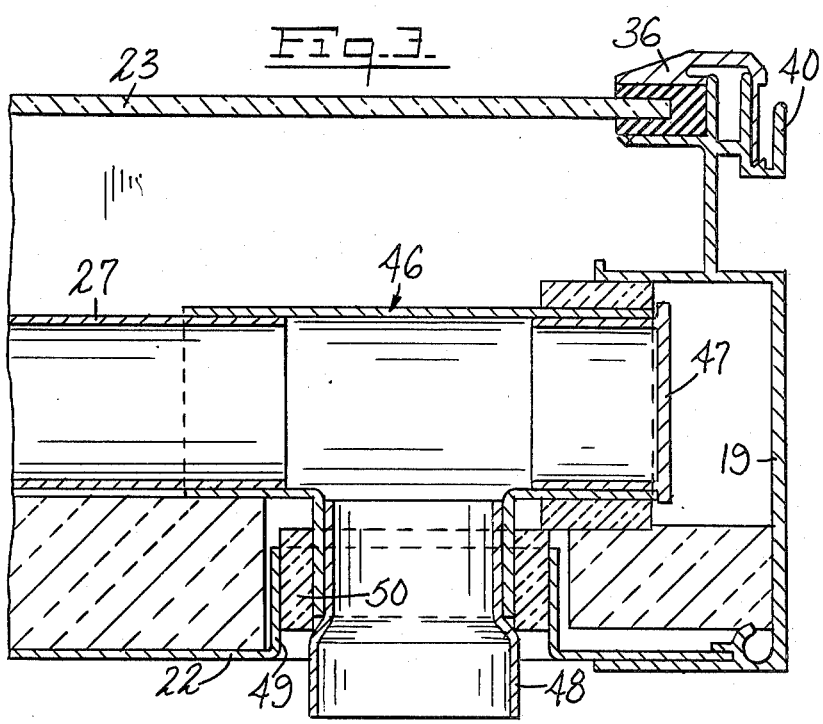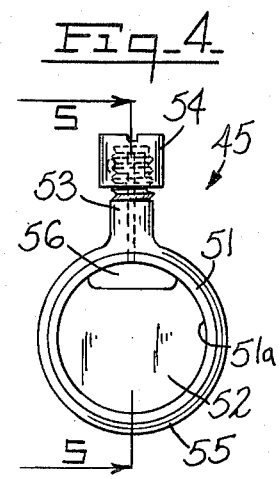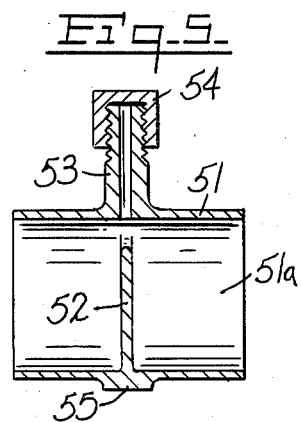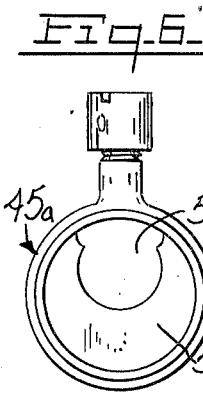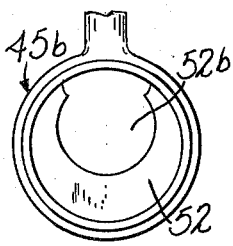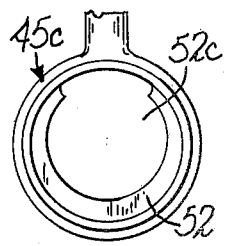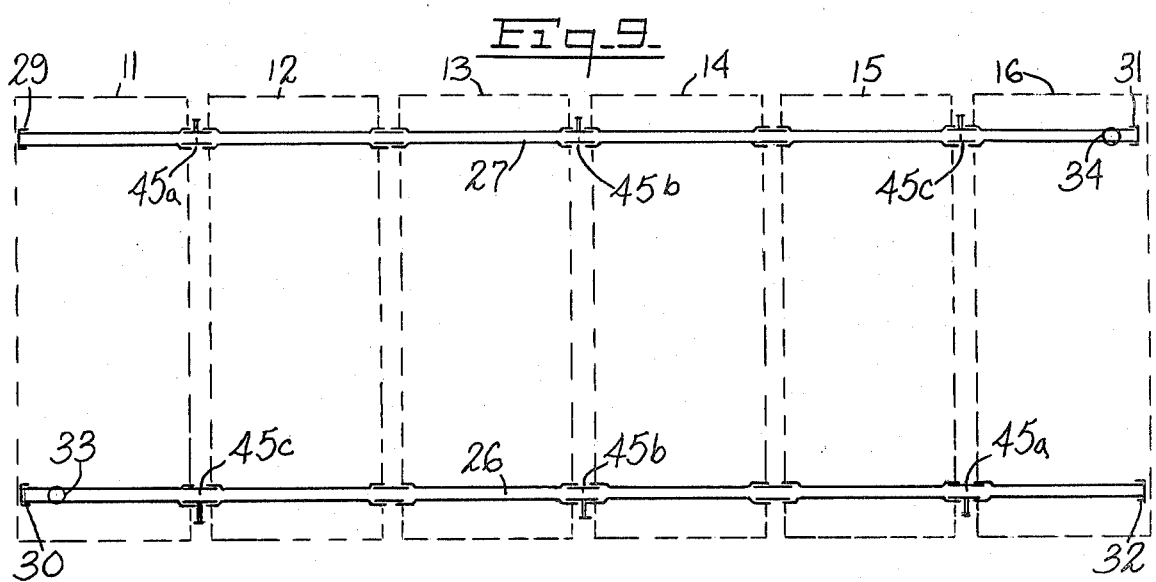

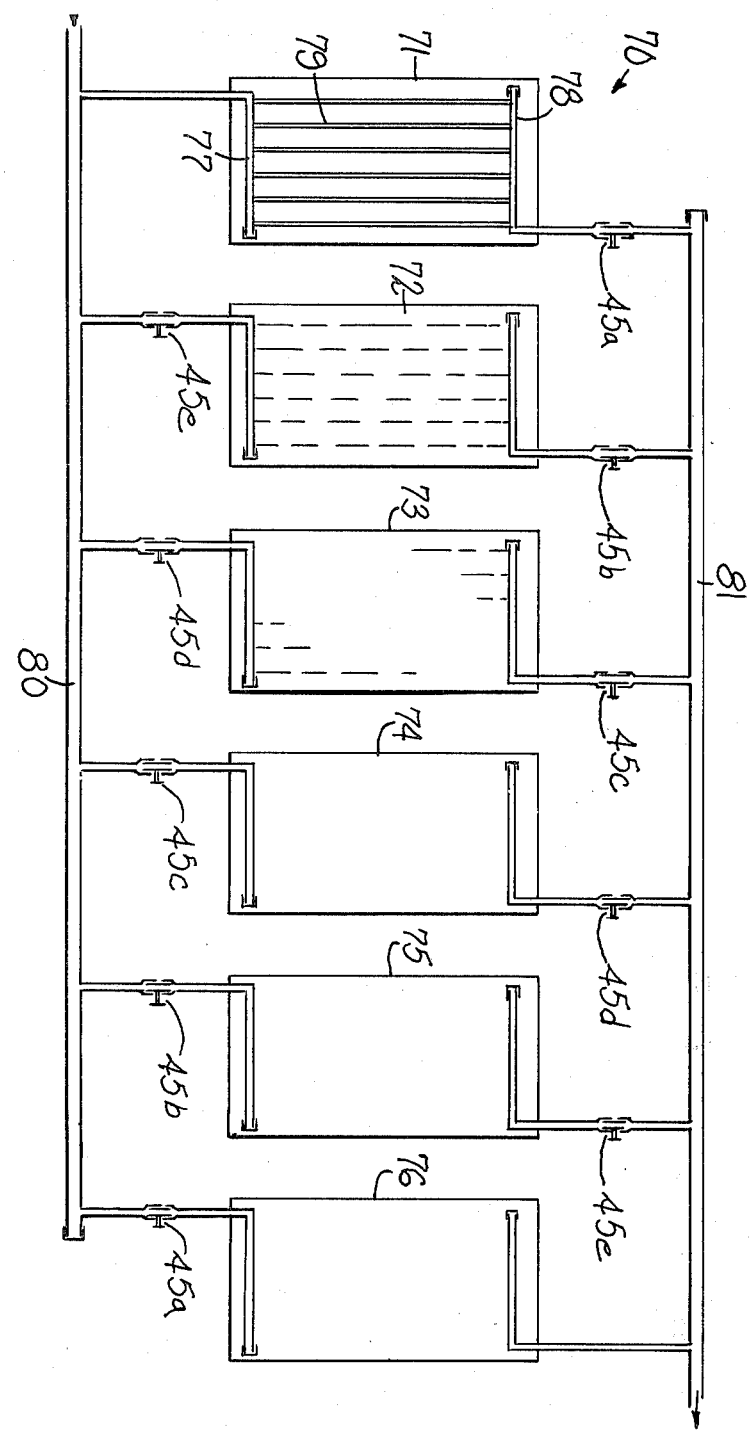

SOLAR ENERGY COLLECTOR SYSTEM HAVING BALANCED HEAT-EXCHANGE FLUID FLOW

This is a continuation, of application Ser. No. 922,751, filed July 7, 1978, now abandoned.

This invention relates to solar energy collectors of the liquid heat-exchange type.

Collectors of the liquid heat-exchange type generally comprise a housing having an absorber located therein. A plurality of conduits are connected between upper and lower headers and in intimate heat-exchange relationship with the absorber. The headers of each collector may be connected to common manifolds or other conduits, or directly to the headers of adjacent collectors.

When several of the collectors in an array are connected in a parallel flow arrangement for liquid in the conduits, a flow condition develops which creates non-uniform output temperatures in the collector array. The temperature of the liquid from the collectors in the center of the array is generally substantially higher than the temperature of the liquid from collectors at the ends of the array. This indicates that less liquid is flowing through the center collectors than through the end collectors, and therefore less total heat is transferred to the liquid in the center collectors, notwithstanding the higher temperatures. The non-uniform fluid flow is due to the fact that both headers are of constant dimension from one end of the collector array to the other. This causes a condition of relatively low flow resistance through the headers near the inlet and outlet ends of the array and relatively high flow resistance through the headers at the center of the array. The greater the resistance to fluid flow the lower the flow rate. The lower the flow rate of a fluid through a collector the higher the outlet temperature of the collector.

The non-uniform fluid flow could be counteracted by providing appropriately tapered headers or manifolds. However, this is not a practical solution from the standpoint of manufacturing expense.

Another solution is to place balancing valves between the connections of the headers of each collector, or between the respective manifolds and the collectors. Such valves are, however, expensive and require large spacing between adjacent collectors, reducing the area of collector coverage where the area available to collect sunlight is limited. Furthermore, the individual valves each require proper adjustment, which can take a considerable amount of time and is often not done properly by installers.

The present invention provides a new and improved device for regulating the flow of liquid through manifolds or headers of a collector array, facilitating a shortened coupling between the headers and manifolds or the headers of adjacent collectors. The invention further provides means for draining liquids from the system and/or bleeding air from the system, depending on the position of the device in the input headers or the output headers.

Briefly stated, the invention is one form thereof provides a coupling member for use in a collector array connected in a parallel flow arrangement and disposed between the headers of adjacent collectors. The coupling member has an internal baffle with an orifice therethrough. The size of the orifice may be varied depending on the position of the member in the system. The members have a uniform external diameter to permit them to be attached to the collector headers. The coupling members may further include a normally closed bleeder vent which can be used either to bleed air or drain liquid from the system depending on whether it is directed upwardly or downwardly.

In a second embodiment, the member is resilient and includes an accordion fold to permit the headers to expand or contract. In this embodiment the bleed vent is optional.

An object of this invention is to provide a new and improved apparatus for regulating the flow of liquid in an array of parallel liquid heat-exchange solar energy collectors.

Another object of the invention is to provide a new and improved header or manifold coupling member for collectors of the type described which functions to regulate the flow of liquid to the respective collectors and facilitates reducing the spacing between collectors in the array.

A further object of the invention is to provide a new and improved coupling member of the type described which also permits bleeding and draining of the system.

The features of the invention which are believed to be novel are particularly pointed out and distinctly claimed in the concluding portion of this specification. The invention, however, both as to its organization and operation together with further objects and advantages thereof may best be appreciated by reference to the following detailed description taken in conjunction with the drawings, wherein:

FIG. 1 is a plan view of a six collector array with the covers of three collectors partially cut away;

FIG. 2 is a view partially in section seen in the plane of lines 2—2 of FIG. 1;

FIG. 3 is a sectional view seen in the plane of lines 3—3 of FIG. 1;

FIG. 4 is an end view of a coupling member for coupling the headers of adjacent collectors together;

FIG. 5 is a sectional view seen in the plane of lines 5—5 of FIG. 4;

FIGS. 6, 7 and 8 are views of the connector of FIG. 4 showing progressively larger areas of the internal baffle thereof removed;

FIG. 9 is a schematic diagram of the collector array of FIG. 1 showing the headers and the coupling member therebetween;

FIG. 10 is a side sectional view of a second embodiment of the invention; and

FIG. 11 is a schematic diagram of a collector array between manifolds and having coupling members between the manifolds and the collectors.

An array 10 of collectors includes a plurality of individual collectors. As exemplified in FIG. 1, array 10 includes six collectors 11–16. Each collector comprises a housing 17 including side walls 18 and 19, end walls 20 and 21, a base 22 and transparent cover 23. Within the housing is situated an absorber 24 resting on insulation 25. Extending inside the collectors along the lower and upper ends of the absorber are lower and upper headers 26 and 27. A plurality of conduits 28 extend between headers 26 and 27 in intimate heat-exchange relationship with absorber 24. The headers 26 and 27 are exemplified as being connected to headers of adjacent collectors. Each header may alternatively be connected to manifolds (see FIG. 11). The ends of the headers in the extreme upstream and downstream collectors are terminated by caps 29 through 32. The lower header of the upstream collector 11 includes a liquid inlet 33 and the downstream collector 16 upper header 27 includes an outlet 34. The outlet and inlet are similar in construction. The outlet is exemplified in FIG. 3, and hereinafter described.

As exemplified in FIG. 2, each collector includes a housing shown as being of the type disclosed in co-pending application Ser. No. 772,971, filed Feb. 28, 1977 now U.S. Pat. No. 4,123,883. Side wall 19 includes an inwardly directed ledge 35 for supporting transparent cover member 23. The cover member is clamped between support ledge 35 and a cap 36, which is affixed to side wall 19 by means of screws extending into the trough formed by vertical members 37 and 38 and horizontal member 39. A flashing reglet 40 provides a seat for flashing (not shown) extending between adjacent collectors.

Header 27 extends through an aperture 41 in side wall 19. An adapter member 42 is seated in aperture 41 and carries therein an annulus of sealing member 43 which surrounds header 27 to insulate it from contact with the housing frame and prevent cooler ambient air from leaking into the collector.

Header 27 is provided with ends 44 swaged to a slightly enlarged diameter. The enlarged ends receive a coupling member 45 described more fully hereinafter. Headers 26 are also provided with enlarged ends to receive a coupling member 45.

An arrangement of the outlet 34 of the collector array is exemplified in FIG. 3. Header 27 terminates short of end wall 19 and is received within one arm of a tee-shaped fitting 46. The other arm of tee 46 received a cap 47. The lower leg of tee 46 received a fitting 48 adapted to receive a conduit (not shown) to a heat storage or heat utilization device, depending on the purpose of the heating system. The fitting 48 extends through base 22, the base including an adapter 49 extending into the collector. An annular sealing member 50 insulates tee 46 and fitting 48 from the base 22.

As exemplified in FIGS. 4 and 5, coupling member 45 includes a hollow cylindrical body 51 defining a passageway 51a and having an internal baffle 52 extending thereacross. Varying areas of baffle 52 are removed to define orifices having sizes depending on the location of a particular coupling member 45 in the array. A bleed vent 53 extends from the body, covered by cap 54 threaded thereon. The bleed vent 53 preferably extends from the center of the cylindrical body. A collar 55 extends around the center of the body to provide uniform separation for the opposing ends of the headers connected thereto, and to facilitate soldering the ends to member 45.

FIGS. 6, 7 and 8 exemplify three coupling members 45a, 45b and 45c in which differing areas of baffle 52 have been removed.

FIG. 6 exemplifies a coupling member 45a in which a small area of baffle 52 has been removed to provide a small orifice 52a. Coupling member 45b has a larger orifice 52b in its baffle and coupling member 45c, shown in FIG. 8, has a still larger orifice 52c in its baffle 52. It is apparent that flow through coupling member 45a will be restricted to a greater extent than through coupling member 45b, and flow through coupling member 45c will be restricted the least.

The array 10, as schematically exemplified in FIG. 9, has coupling member 45c coupling headers 26 of collectors 11 and 12, coupling member 45b coupling headers 26 of collectors 13 and 14, and coupling member 45a coupling headers 26 of collectors 15 and 16. The inlet 33 is situated in headers 26 of upstream collector 11. The heat-exchange conduits 28 of the individual collectors are not shown in FIG. 9.

Coupling member 45a serves to couple the headers 27 of collectors 11 and 12, coupling member 45b couples headers 27 of collectors 13 and 14 and coupling member 45c couples headers 27 of collectors 15 and 16. Outlet 34 is situated in header 27 of downstream collector 16.

The coupling between the other header ends may be a coupling disclosed in application Ser. No. 883,393, filed Mar. 6, 1978, now abandoned arranged to compensate for header expansion and contraction.

In operation, the liquid entering from inlet 33 into headers 26 encounters increased resistance to flow due to the coupling 45c in headers 26 and coupling 45a in headers 27, thus insuring a given flow in the conduits 28 of collector 11.

Couplings 45b in headers 26 present further resistance to direct flow of the liquid in both headers and thus provides a given flow in the conduits 28 of collectors 12 and 13. Coupling 45b in headers 27 has a larger orifice than coupling 45a and presents less resistance to total liquid flow in header 27. Therefore the liquid in the headers of collectors 11, 12 and 13 may flow at substantially the same rate.

Coupling 45a in headers 26 and coupling 45c in headers 27 further increase the resistance to flow in both headers, which insures substantially uniform flow through the conduits 28 of collector 16.

Coupling 45c in headers 27 has the largest orifice 52c of the couplings in headers 27 to offer the least resistance to the liquid entering headers 27 of collectors 11–15.

The arrangement of the coupling members 45a–45c in the array of FIG. 9 presents a system analogous to headers 26 having a decreasing cross-sectional area from collector 11 to collector 16, and headers 27 having an increasing cross-sectional area from collector 11 to collector 16. In this manner the pressure of the liquid at each conduit 28 at its junction with a header 26 is substantially constant resulting in substantially uniform liquid flow through each conduit 28. This results in higher overall efficiency of the collector array.

Bleed vent 53 can serve as either an air vent or as a drain, depending on whether the vent is directed upwardly or downwardly. In array 10, exemplified in FIG. 9, the vents of the coupling members between headers 27 are shown directed upwardly and thus serve as air vents. The vents in coupling members in lower headers 26 are directed downwardly, and can serve as drains.

Baffle 52 shown in FIGS. 4 and 5 is exemplified as being across the center of the body 51. Baffle 52 may be situated anywhere along passageway 51a. If baffle 52 is not directly opposite bleed vent 53, opening 56 need not initially be provided in baffle 52.

Bleed vent 53 may be omitted from the coupling member. In such event, opening 56 may similarly be omitted.

Baffle 52 may take any convenient shape. The baffle may be angled with respect to fluid flow; it may have, for example, a traingular cross-section, a smooth curve approximating a venturi. A venturi may reduce fluid turbulence in the system.

The sizes and relative sizes of openings 52a, 52b and 52c in the internal baffles 52 examplified in FIGS. 6, 7 and 8 are by way of example only. The particular size of the openings is selected to balance fluid flow to each of the collectors 11 through 16 in the array 10. If a longer array is required in an installation having more collectors, more coupling members 45 may be provided between subsequent pairs of collectors, and the orifices 52 in all of the coupling members must be adjusted accordingly.

Coupling member 45 may be formed from a rigid material such as brass, or alternatively may be formed from a resilient material such as silicone.

FIG. 10 exemplifies a coupling member 57 formed from a resilient material such as silicone. Member 57 includes a body 58 which is substantially cylindrical except for a circumferential accordion fold 59 which will accommodate expansion and contraction of the headers.

Body 58 defines a passageway 60 having baffle 61 extending thereacross. Member 57 is used in the same manner as member 45, with varying amounts of baffle 61 being removed depending on the location in the collector array, and the ends of body 58 receiving the ends of the headers therein.

FIG. 11 schematically illustrates an array 70 of six collectors 71 through 76, each having an inlet header 77 and an outlet header 78. A plurality of heat-exchange conduits 79 extend between headers 77 and 78 in each collector. The collectors are connected between an inlet manifold 80 and an outlet manifold 81.

The inlet headers of collectors 71–76 are connected to inlet manifold 80, the headers of collectors 72 through 76 being connected through couplings 45e throough 45a, respectively. The upstream collector 71 is connected directly to inlet manifold 80. Couplings 45d and 45e are similar to coupling members 45a through 45c with successively larger portions of baffle 52 being removed in couplings 45d and 45e.

Similarly, the outlet headers of collectors 71–76 are connected to outlet manifold 81, the headers of collectors 71–75 being connected through coupling members 45a through 45e, respectively.

In the absence of coupling members 45a through 45e, with the varying size baffles, the flow of fluid through the collectors would not be balanced and the collectors towards the center would be warmer.

In operation, the effect of the couplings 45a–45e between manifold 80 and headers 77 is to present a substantially uniform fluid pressure in the manifold 77 of all of the collectors, and the couplings 45a–45e between headers 78 and manifold 81 act to balance the total flow of liquid through each of the collectors. This arrangement effectively acts as an inlet manifold of decreasing tapering cross-section from upstream toward the downstream and an outlet manifold of increasing flaring cross-section from the upstream toward the downstream.

Alternately, the couplings may be installed in manifolds 80 and 81 to achieve a similar flow pattern.

Various arrangements of the balancing inserts may be utilized. They need not be placed above one another as shown in FIG. 9. For example, in an eight collector array, three inserts 45a, 45b and 45c may be used in the return header between the first four collectors, and three inserts 45c, 45b, and 45a between the last four collectors in the supply headers.

This arrangement provides an advantage in that the total pressure drop across the entire array is less than for arrays with the inserts above one another in the return and supply header connections as described in connection with FIG. 9.

The lower total pressue drop is desirable in that it reduces the pumping energy required to move a given amount of liquid through the collector.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. An array of solar collectors of the liquid heat-exchange type where each collector comprises spaced-apart first and second headers with conduits extending therebetween, the headers of said collectors being connected in header lines so that heat-exchange fluid introduced into said first header flows through said first header line and said conduits to said second header line and exits therefrom, the fluid input being to one end of said first header line and the output from the other end of said header line, means connecting said headers to form said header lines, said connecting means comprising at least in part coupling members defining a passage therethrough, said coupling members having two ends, each end adapted to be coupled to a header, means in said coupling means intermediate said ends defining a flow restricting orifice, the orifices of said coupling members in the input header line being of progressively decreasing area from the input end, and the orifices of coupling members in said output line being of progressively increasing area from the first collector to balance the flow of liquid passing through said collectors.

2. An array as defined in claim 1, where the array is positioned at an angle to the horizontal wherein each of the coupling members includes a normally-closed bleed vent, each of the vents of the coupling members associated with the lower headers being inclined downwardly to facilitate draining the array and each of the vents of the coupling members associated with the upper headers being inclined upwardly to facilitate venting the array.

3. A coupling member as defined in claim 1 wherein said body is resilient.

4. A coupling member as defined in claim 3 which includes a circumferential accordion fold.

5. A solar collector array of the liquid heat-exchange type, each collector having inlet and outlet headers with conduits extending therebetween, inlet and outlet manifolds, said inlet headers adapted to be coupled to said inlet manifold and said outlet headers adapted to be coupled to said outlet manifold, and coupling members each adapted to couple a header to an associated manifold to facilitate the balanced flow of liquid through the array of collectors, said coupling members having one end connected to a header and the other end connected to the associated manifold, means defining a passageway through said coupling members between said ends, at least some of said coupling members having means defining a flow restricting orifice intermediate the ends thereof, to balance the flow of liquid passing through said collectors the restricting orifices in coupling members between said inlet manifold and said inlet headers progressively decreasing in area from the input to said inlet manifold, the restricting orifices in coupling members between said outlet headers and said outlet manifold progressively increasing in area from the input end of said inlet manifold.

6. The array of claim 1, wherein said orifice defining means are baffles formed integral with said coupling members.

7. The array of claim 1, further comprising a normally closed bleed vent extending from said coupling members.

8. The array of claim 6, wherein the area of said orifices are defined by removal of portions of said baffles.

9. A coupling member as defined in claim 5 wherein said body is resilient.

10. A coupling member as defined in claim 9 which includes a circumferential accordion fold.

* * * * *